(12) United States Patent
Fuehrer

(10) Patent No.: US 10,644,433 B2
(45) Date of Patent: May 5, 2020

(54) PLUG CONNECTOR PART FOR PLUG-IN CONNECTION TO A MATING PLUG CONNECTOR PART

(71) Applicant: Phoenix Contact E-Mobility GmbH, Schieder-Schwalenberg (DE)

(72) Inventor: Thomas Fuehrer, Blomberg (DE)

(73) Assignee: PHOENIX CONTACT E-MOBILITY GMBH, Schieder-Schwalenberg (DE)

(*) Notice: Subject to any disclaimer, the term of this patent is extended or adjusted under 35 U.S.C. 154(b) by 0 days.

(21) Appl. No.: 16/080,671

(22) PCT Filed: Feb. 20, 2017

(86) PCT No.: PCT/EP2017/053769
§ 371 (c)(1),
(2) Date: Aug. 29, 2018

(87) PCT Pub. No.: WO2017/162381
PCT Pub. Date: Sep. 28, 2017

(65) Prior Publication Data
US 2019/0074628 A1    Mar. 7, 2019

(30) Foreign Application Priority Data
Mar. 22, 2016    (DE) ........................ 10 2016 105 371

(51) Int. Cl.
*H01R 13/66*    (2006.01)
*H01R 13/502*    (2006.01)
(Continued)

(52) U.S. Cl.
CPC .......... *H01R 13/5025* (2013.01); *B60L 53/16* (2019.02); *H01R 13/502* (2013.01);
(Continued)

(58) Field of Classification Search
CPC ............ H01R 13/5025; H01R 13/5221; H01R 13/502; H01R 13/639; H01R 13/424;
(Continued)

(56) References Cited

U.S. PATENT DOCUMENTS

| 5,401,174 A | 3/1995 | Hansen |
| 5,820,395 A | 10/1998 | Hashizawa |

(Continued)

FOREIGN PATENT DOCUMENTS

| DE | 19650099 C2 | 6/1997 |
| DE | 102013102823 A1 | 9/2014 |

(Continued)

*Primary Examiner* — Jean F Duverne
(74) *Attorney, Agent, or Firm* — Leydig, Voit & Mayer, Ltd.

(57) ABSTRACT

A plug-in connector part for plug-in connection to a mating plug-in connector part includes: a housing part comprising a first material; at least one plug-in element, arranged on the housing part, for electrically contacting the mating plug-in connector part; and an attachment part, which is attached to the housing part, being detachably connected to the housing part, the attachment part having at least one plug-in portion having an opening in which the at least one plug-in element is arranged, the attachment part comprising a second material that is different from the first material.

11 Claims, 4 Drawing Sheets

(51) Int. Cl.
*B60L 53/16* (2019.01)
*H01R 13/52* (2006.01)
*H01R 13/639* (2006.01)

(52) U.S. Cl.
CPC ....... *H01R 13/5221* (2013.01); *H01R 13/639* (2013.01); *H01R 2201/26* (2013.01)

(58) Field of Classification Search
CPC  H01R 13/506; H01R 13/6275; A61K 31/661; B60L 11/1818
See application file for complete search history.

(56) References Cited

U.S. PATENT DOCUMENTS

| | | | | |
|---|---|---|---|---|
| 6,036,521 | A * | 3/2000 | Tabor | H01R 13/5221 439/272 |
| 9,106,015 | B2 * | 8/2015 | Ohmura | H01R 13/6275 |
| 9,463,702 | B2 * | 10/2016 | Fukushima | H01R 13/506 |
| 9,509,095 | B2 * | 11/2016 | Ohmura | H01R 13/639 |
| 9,735,516 | B2 * | 8/2017 | Ens | H01R 13/424 |
| 2011/0223792 | A1 * | 9/2011 | Osawa | H01R 13/6275 439/345 |
| 2011/0260684 | A1 * | 10/2011 | Xiaofeng | A61K 31/661 320/109 |
| 2014/0308846 | A1 | 10/2014 | Bianca | |
| 2015/0311602 | A1 | 10/2015 | Duesterhoeft et al. | |

FOREIGN PATENT DOCUMENTS

| | | |
|---|---|---|
| EP | 2509170 A1 | 10/2012 |
| EP | 2728678 A1 | 5/2014 |
| GB | 2503349 A | 12/2013 |
| WO | WO 2014157317 A1 | 10/2014 |

* cited by examiner

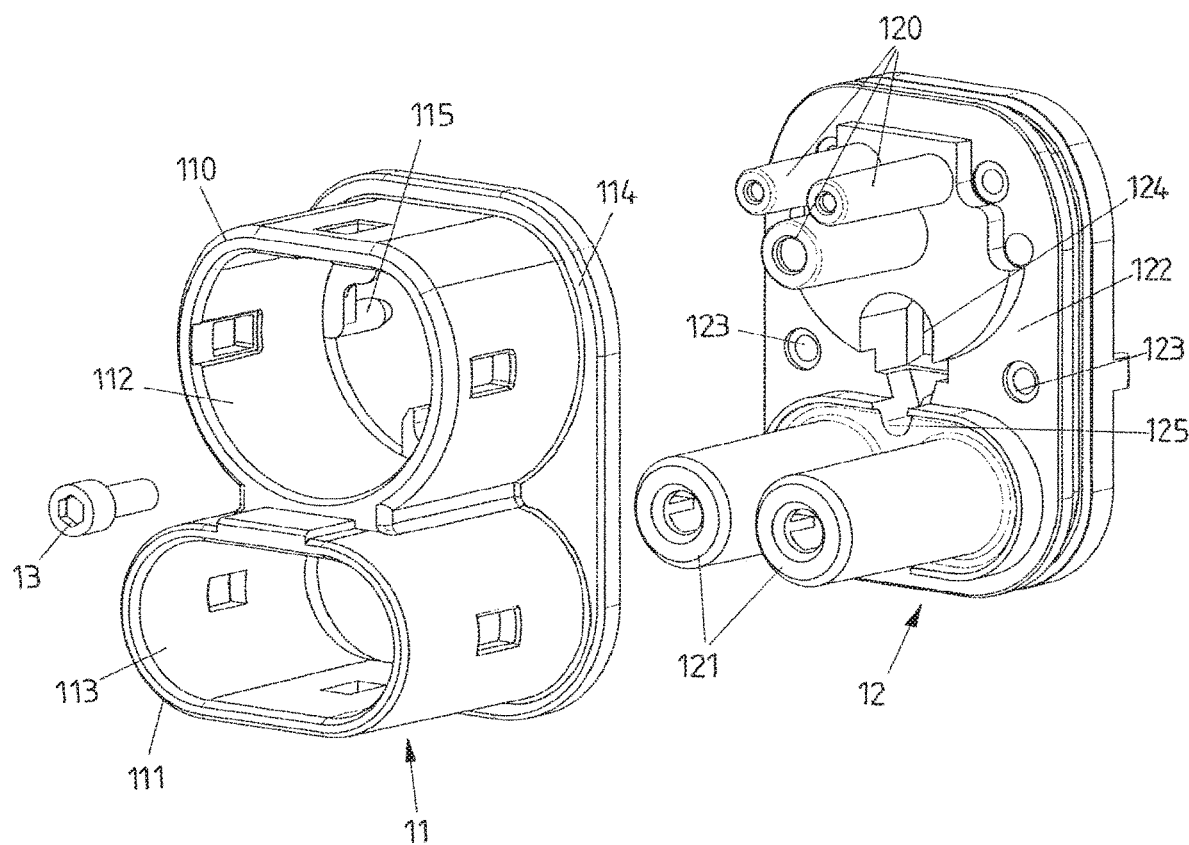

PLUG CONNECTOR PART FOR PLUG-IN CONNECTION TO A MATING PLUG CONNECTOR PART

CROSS-REFERENCE TO PRIOR APPLICATIONS

This application is a U.S. National Phase application under 35 U.S.C. § 371 of International Application No. PCT/EP2017/053769, filed on Feb. 20, 2017, and claims benefit to German Patent Application No. DE 10 2016 105 371.6, filed on Mar. 22, 2016. The International Application was published in German on Sep. 28, 2017 as WO 2017/162381 under PCT Article 21(2).

FIELD

The invention relates to a plug-in connector part for plug-in connection to a mating plug-in connector part.

BACKGROUND

A plug-in connector part of this kind comprises a housing part that is made of a first material, and at least one plug-in element, arranged on the housing part, for electrically contacting the mating plug-in connector part.

In a plug-in connector part known, for example, from DE 10 2013 102 823 A1 in the form of a charging plug, two plug-in portions are formed on a housing part, each having an opening, within which a plurality of plug-in elements are arranged. The pin-shaped plug-in elements each have an electrical contact element in the plug-in opening in order to electrically contact an associated mating plug-in connector part in the form of a charging socket. For the plug-in connection of the plug-in connector part to the mating plug-in connector part, the plug-in connector part is inserted into associated insertion openings in the mating plug-in connector part by means of the plug-in portions on the housing part such that the electrical contact elements on the plug-in elements engage with associated mating contact elements in an electrically contacting manner and charging currents can thus be transmitted between the charging plug and the charging socket.

A charging plug of this kind can be arranged, for example, on a charging cable that is used for electrically connecting a charging station to an electric vehicle, i.e. an electrically powered vehicle. For a charging process, the charging plug is inserted, for example, into a charging socket on the electric vehicle such that charging currents can be transmitted from the charging station to the electric vehicle.

A plug-in connector part of this type, designed as a charging plug, for example, is subject to wear during normal use and is exposed to high mechanical loads. If, for example, a plug-in connector part is dropped, impact forces act in particular on the outer contours of the plug-in connector part, for example on plug-in portions that are formed on the housing and within which the plug-in elements for making electrical contact are arranged. Because the housing of a plug-in connector part is generally made of plastics material, damage may be thus be sustained if the plug-in connector part is dropped.

In addition, in particular if the plug-in connector part is used outside, the environmental conditions may also lead to material changes in the housing of the plug-in connector part if the housing is made e.g. of plastics material, which may impair the strength of portions of the housing.

There is thus a need for a plug-in connector part that is protected from wear and poor handling.

In a plug-in connector part known from DE 196 50 099 C2, a seal holder is arranged on a front edge on a plug-in portion of a housing part, which holder has a circular projection made of metal for protecting a connection end of the plug-in portion of the plug-in housing.

SUMMARY

In an embodiment, the present invention provides a plug-in connector part for plug-in connection to a mating plug-in connector part, comprising: a housing part comprising a first material; at least one plug-in element arranged on the housing part and configured to electrically contact the mating plug-in connector part; and an attachment part detachably connected to the housing part, the attachment part having at least one plug-in portion having an opening in which the at least one plug-in element is arranged, the attachment part comprising a second material that is different from the first material.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 is a separate, enlarged view of the attachment part and of the housing part;

DETAILED DESCRIPTION

Figure 1:
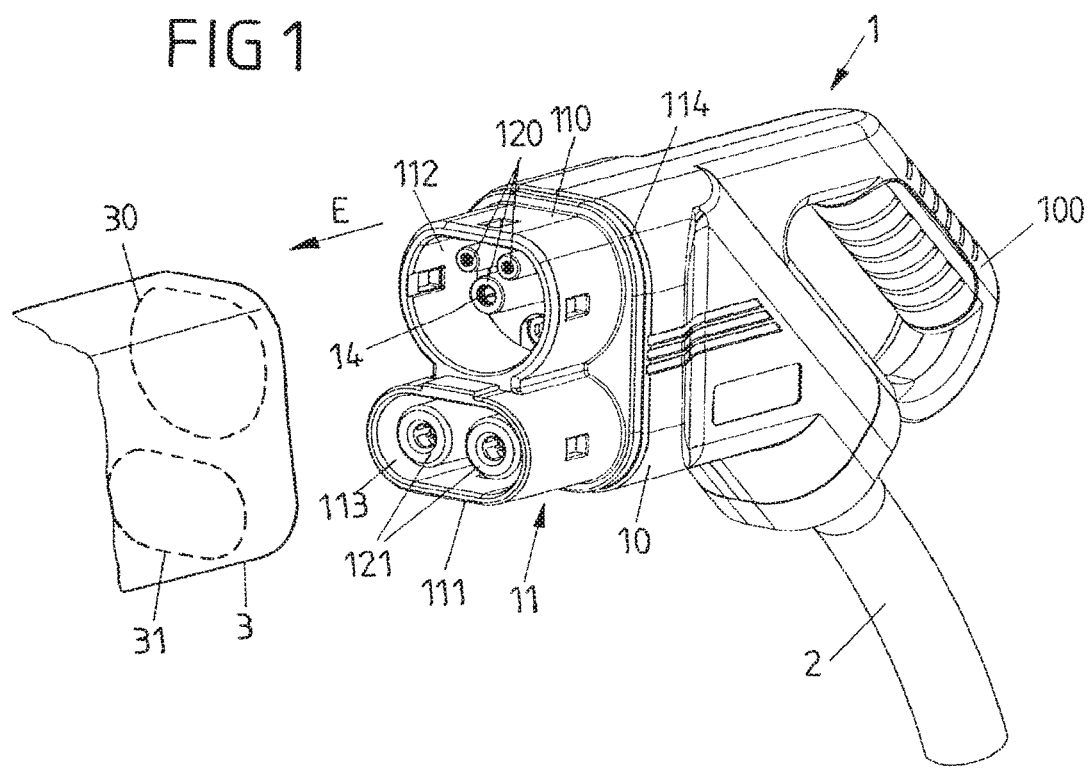
FIG. 1 is a perspective view of an embodiment of a plug-in connector part in the form of a charging plug.

Accordingly, the plug-in connector part has an attachment part, which is attached to the housing part, is detachably connected to the housing part, has at least one plug-in portion having an opening in which the at least one plug-in element is arranged, and is made of a second material that is different from the first material.

The housing part of the plug-in connector part may be made, for example, from plastics material, in particular a thermoplastic material. By contrast, the attachment part is preferably made of metal, for example a metal die-cast material, in particular as an aluminum die-cast part.

A plug-in connector part of this kind makes it possible to provide two-fold protection from wear and improper handling, for example if the plug-in connector part is dropped.

Firstly, the attachment part attached to the housing part is made of a material that is different from the housing part, e.g. a harder material, for example a metal. The attachment part has a plug-in portion which is brought into plug-in engagement with an insertion opening in the mating plug-in connector part in order to connect the plug-in connector part to an associated mating plug-in connector part, and which surrounds an opening, within which the at least one plug-in element, by means of which the actual electrical contacting takes place, is arranged. The plug-in element is thus externally protected by the plug-in portion. In particular, if the plug-in connector part is dropped, impact forces on the plug-in portion can be intercepted, without the plug-in element arranged within the opening in the plug-in portion being impaired by the impact forces.

Since the attachment part having the plug-in portion is formed of a different material, in particular a material which is harder than other parts of the housing of the plug-in connector part, the attachment part can be designed such that the attachment part can effectively absorb and dissipate impact forces if the plug-in connector part is dropped, without the plug-in connector part sustaining damage.

Secondly, the attachment part is detachably connected to the housing part. This makes it possible to easily replace the attachment part if the attachment part still sustains damage, for example if the plug-in connector part is dropped. If, for example, the plug-in portion breaks, a user can detach the attachment part from the housing part and replace it with another attachment part such that e.g. a user can easily restore the plug-in connector part.

In the case of the plug-in connector part provided, a housing portion on which a plug-in contour is formed for plug-in connection to the mating plug-in connector part has a two-part structure. In this way, plug-in elements that have electrical contact elements for making electrical contact or are formed by electrical contact elements of this kind are arranged on the housing part, which may be connected, for example, to a housing body of the plug-in connector part. An attachment part is in turn detachably attached to the housing part. Said attachment part forms a plug-in portion, within which one or more plug-in elements of the housing part are inserted and which thus provides mechanical protection for the plug-in elements of the housing part. If the plug-in connector part strikes hard ground, for example, on the front housing portion thereof that forms the plug-in contour, impact forces are largely absorbed and dissipated by the attachment part. Since the attachment part is made of a different material than the housing part, for example a metal material, the attachment part is suitably designed to absorb and dissipate impact forces of this kind. If the attachment part still sustains damage, it can be easily changed by releasing the connection to the housing part and replaced with another attachment part.

In one embodiment, the attachment part has a planar portion which preferably extends transversely to the insertion direction (in which the plug-in connector part can be brought into engagement with the associated mating plug-in connector part) and which rests flat against an associated planar portion of the housing part when the attachment part is attached to the housing part. The plug-in portion projects from said planar portion and accommodates one or more plug-in elements within the opening in said plug-in portion, which plug-in elements are arranged on the housing part.

For example, one or two plug-in portions may be formed on the attachment part, within each of which portions one or more plug-in elements are arranged for electrically contacting the associated mating plug-in connector part. By providing a plurality of plug-in portions, a "combi plug" can be provided, for example, which can be used selectively to transmit charging currents in the form of direct current or in the form of alternating current.

In an operational state, the attachment part is attached to the housing part and connected to the housing part. In order to secure the attachment part to the housing part in a rotationally fixed manner, one or more form-fit elements may be provided on the attachment part, for example in the form of pins that engage with associated mating form-fit elements on the housing part, for example in the form of openings, such that a form fit is established between the attachment part and the housing part and the attachment part is secured in its rotational position (reference is made to the insertion direction in which the plug-in connector part can be brought into engagement with the mating plug-in connector part) relative to the housing part.

For example, in one embodiment, one or more pin-shaped form-fit elements may be arranged on the attachment part, which form-fittingly engage with openings in the housing part.

In another embodiment, it is also possible for one or more projecting, pin-shaped form-fit elements to be arranged on the housing part, which form-fittingly engage with associated openings in the attachment part.

Form-fit elements of this kind may be designed, for example, in the form of cylindrical pins having a circular cross section or having a cross section that deviates from a circular shape.

In one embodiment, the attachment part has an engagement element that engages with a mating element on the housing part. An opening may be formed, for example, in said engagement element, through which opening a fastening element, for example in the form of a screw, engages such that the attachment part is connected to the housing part by means of the engagement element. If the fastening element is designed as a screw, the fastening element engages, for example, in an opening in the housing part, it being possible for an internal thread in said opening to be designed such that the engagement of the fastening element in the opening is self-locking.

In order to detach the attachment part from the housing part, the fastening element can be released such that the attachment part can be removed from the housing part after the fastening element has been released.

The plug-in connector part advantageously comprises a housing body to which the housing part is attached. The housing body may, for example, enclose an interior in which a contact insert is arranged, by means of which electrical contact elements are connected to an electrical cable that extends from the plug-in connector part. The housing part closes the housing body at a front side facing the associated mating plug-in connector part, it being possible for the housing part to rest against the housing body on an edge, for example, and to be sealed in relation to the housing body at said edge such that a moisture-tight transition between the housing part and the housing body is provided. The edge preferably surrounds the housing part all the way round such that the housing body is closed off in a moisture-tight manner towards the housing part by means of the sealing at the edge.

The sealing of the housing body on the part of the plug-in contour thus takes place solely by means of the housing part. In this case, the attachment part does not have to be sealed in a particular manner either in relation to the housing part or in relation to the housing body.

The plug-in connector part is designed, for example, as a charging plug for charging an electric vehicle. A charging plug of this kind may be part of a charging system and may be connected, for example, to a charging cable to establish an electrical connection for transmitting charging currents between a charging station and an electric vehicle.

However, the plug-in connector part may also be designed e.g. as a charging socket and arranged, for example, on an electric vehicle or on a charging station.

FIG. 1 is a view of a plug-in connector part 1 which is designed as a charging plug within the context of a charging system for charging an electric vehicle and is connected to a cable 2. The cable 2 may, for example, be connected to a charging station and enclose a plurality of wires, via which charging currents can be transmitted.

The plug-in connector part 1 can be brought into engagement, in a insertion direction E, with an associated mating plug-in connector part 3, for example in the form of a charging socket on an electric vehicle, such that, when the plug-in connector part 1 is connected, charging currents can be transmitted from the charging station to the electric vehicle and the electric vehicle can thus be electrically charged.

The plug-in connector part 1 has a housing body 10, from which the cable 2 extends and on which a handle 100 is formed for being grasped by a user. The housing body 10 encloses an interior in which, for example, a contact insert may be arranged, by means of which wires of the cable 2 are electrically connected to contact elements of the plug-in connector part 1.

Figure 2:
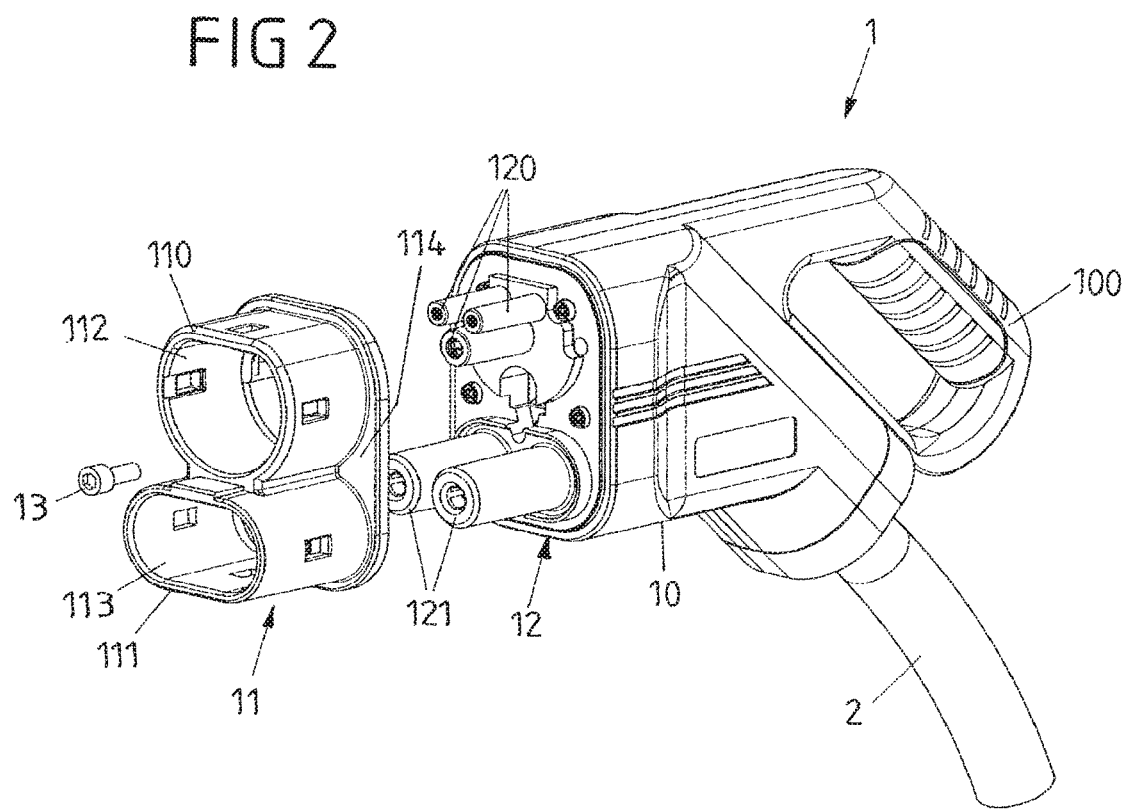
FIG. 2 is a partial exploded view of the plug-in connector part, showing an attachment part to be attached to a housing part.
Figure 4A:
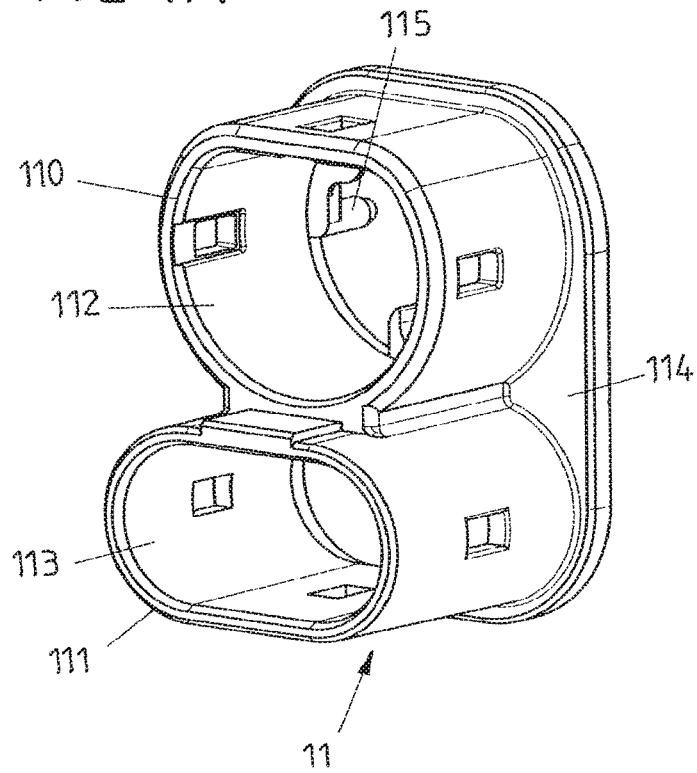
FIG. 4A is a separate view of the attachment part.
Figure 4B:
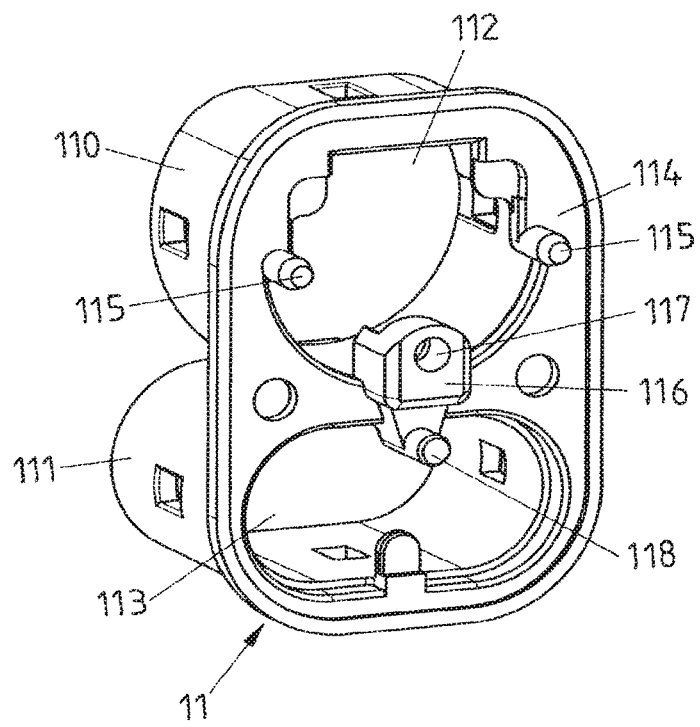
FIG. 4B is another, rear view of the attachment part.
Figure 5A:
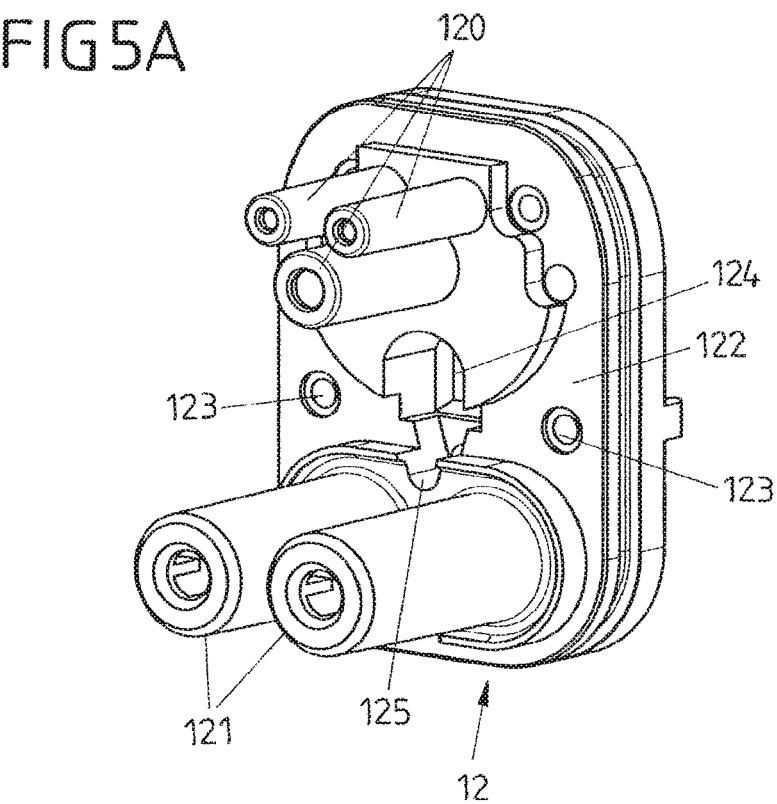
FIG. 5A is a separate view of the housing part.
Figure 5B:
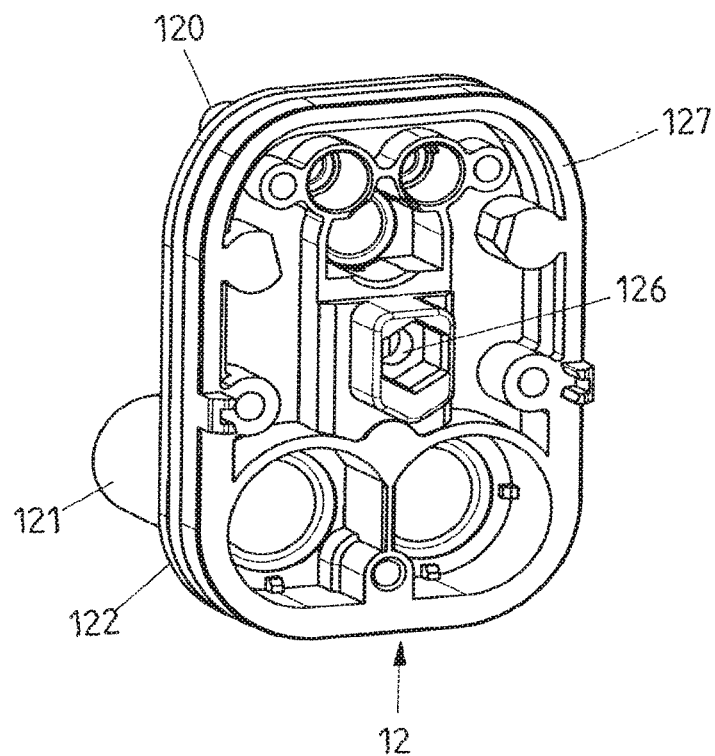
FIG. 5B is another, rear view of the housing part.

As can be seen from the partial exploded view in FIG. 2, a housing part 12 is connected to the housing body 10, which housing part is attached to the housing body 10 by means of a peripheral edge 127 (see FIG. 5B) and is sealed in relation to the housing body 10. The interior enclosed by the housing body 10 is thus outwardly closed off by the housing part 12 and is sealed in a moisture-tight manner such that moisture and dirt cannot enter the interior of the housing from the outside.

For this purpose, a seal, for example, may be provided on the edge 127, for example in the form of an integrally formed sealing lip or in the form of a sealing ring that is to be attached to the edge 127.

The housing part 12 closes off the housing body 10 by means of a planar portion 122. Plug-in elements 120, 121 project outwards from said planar portion 122 in the form of pins, there being two groups of plug-in elements 120 and 121 that are arranged in different plug-in portions 110, 111 of an attachment part 11 to be attached to the housing part 12. Electrical contacts 14 in the form of contact sockets are arranged within openings in the plug-in elements 120, 121 such that the plug-in connector part 1 can electrically contact an associated mating plug-in connector part 3 by means of the plug-in elements 120, 121.

The attachment part 11 is attached to the housing part 12. The attachment part 11 has a planar portion 114, which is attached to the surface of the planar portion 122 of the housing part 12 and rests flat against the planar portion 122 of the housing part 12 when the attachment part 11 is connected.

Two plug-in portions 110, 111 project from the planar portion 114 in the insertion direction E and each enclose an opening 112, 113. A group of plug-in elements 120, 121 of the housing part 12 is arranged in each opening 112, 113 such that, when the attachment part 11 is connected, a first group of plug-in elements 120 is enclosed in a first, upper plug-in portion 110 and a second group of plug-in elements 121 is enclosed in a second, lower plug-in portion 111.

By means of the plug-in portions 110, 111 and the plug-in elements 120, 121 arranged therein, the plug-in connector part 1 can be brought into plug-in engagement with the associated mating plug-in connector part 3 in the insertion direction E, the plug-in portions 110, 111 being inserted for this purpose into associated plug-in openings 30, 31 in the mating plug-in connector part 3. The plug-in connector part 1, together with its two plug-in portions 110, 111, achieves a "combi plug", by means of which both direct current (plug-in elements 121 of the lower plug-in portion 111) and alternating currents (plug-in elements 120 of the upper plug-in portion 110) can be transmitted.

It should be noted at this juncture that the present invention is not in any way limited to combi plugs of this kind, but in principle only one plug-in portion may also be formed on the attachment part 11, within which plug-in portion one or more associated plug-in elements of the housing part 12 are arranged.

The attachment part 11 is designed as a component that is separate from the housing part 12 and is detachably connected to the housing part 12. In addition, the attachment part 11 is made of a different material to that of the housing part 12. For example, the attachment part 11 may be made of a metal material, for example as a metal die-cast part, e.g. as an aluminum die-cast part. By contrast, the housing part 12 may, for example, be made of plastics material, for example a thermoplastic material. The housing part 12 is thus made of an electrically insulating material such that contact elements 14 arranged on the plug-in elements 120, 121 are electrically insulated.

Since the attachment part 11 is made of a different material, which is in particular harder than the housing part 12, the attachment part may have high strength. This makes it possible to produce the attachment part 11 such that the attachment part 11 provides protection from wear and improper handling. If, for example, the plug-in connector part 1 is dropped and strikes hard ground on a plug-in portion 110, 111 of the attachment part 11, impact forces can be absorbed and dissipated by means of the attachment part 11, without the plug-in elements 120, 121 arranged within the openings 112, 113 in the plug-in portions 110, 111 being damaged. Since the attachment part 11 is made of a particularly hard material, damage to the attachment part 11 can be prevented.

If the attachment part 11 still sustains damage, for example on a plug-in portion 110, 111 of the attachment part 11, the attachment part 11 can be detached from the housing part 12 and replaced with another attachment part 11, and therefore the plug-in connector part 1 can be easily restored, for example also by a user.

As can be seen from the views in FIGS. 3, 4A, 4B, 5A and 5B, the attachment part 11 has an engagement element 116 on the planar portion 114, which element is inserted in an associated engagement opening 124 in the planar portion 122 of the housing part 12. An opening 117 is formed in the engagement element 116, through which opening a fastening element 13 in the form of a screw engages. The fastening element 13 engages in a threaded opening 126 (see FIG. 5B) in the housing part 12 such that the attachment part 11 is screwed to the housing part 12 by means of the fastening element 13.

In order to secure the attachment part 11 so as not to rotate relative to the housing part 12, form-fit elements 115, 118 in the form of pins project from the planar portion 114 of the attachment part 11 on a side facing the housing part 12; said form-fit elements engage in associated openings 123, 125 in the planar portion 122 of the housing part 12. A form fit is thus established between the attachment part 11 and the housing part 12 such that the attachment part 11 is secured in its rotational position (with reference to the insertion direction E) relative to the housing part 12.

If the attachment part 11 is to be detached from the housing part 12, the fastening element 13 in the form of the screw can be screwed out of the opening 126 in the housing part 12 such that the attachment part 11 can be removed from the housing part 12 in the insertion direction E. In this way, a damaged attachment part 11 can be replaced with another attachment part 11 in order to restore the plug-in connector part 1. This can take place without the housing part 12 having to be detached from the housing body 10.

Because the interior of the housing body 10 is externally closed off by the housing part 12 and the transition between the housing part 12 and the housing body 10 is sealed in a moisture-tight manner, the transition between the attachment part 11 and the housing part 12 does not have to be sealed in a particular manner.

The concept underlying the invention is not limited to the above-described embodiments, but in principle can also be implemented in an entirely different manner.

A plug-in connector part of the type described herein can be used not only as a charging plug. A plug-in connector part of the type described herein can also be used, for example, as a charging socket or as an entirely different plug-in connector for electrically contacting wires with one another.

The attachment part may have one, two or more plug-in portions. In this respect, the number of plug-in portions is not limited to one or two.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 plug-in connector part (charging socket)
10 housing body
11 attachment part
110, 111 plug-in portion
112, 113 opening
114 planar portion
115 form-fit element (pin)
116 engagement element
117 opening
118 form-fit element (pin)
12 housing part
120, 121 plug-in elements (pins)
122 planar portion
123 mating form-fit element (opening)
124 mating element (engagement opening)
125 mating form-fit element (opening)
126 opening
127 edge
13 fastening element (screw)
14 electrical contact element
2 cable
3 mating plug-in connector part
30, 31 plug-in opening
E insertion direction

The invention claimed is:

1. A plug-in connector part for plug-in connection to a mating plug-in connector part, comprising:
   a housing part comprising a first material;
   at least one plug-in element arranged on the housing part and configured to electrically contact the mating plug-in connector part; and
   an attachment part detachably connected to the housing part, the attachment part having at least one plug-in portion having an opening in which the at least one plug-in element is arranged, the attachment part comprising a second material that is different from the first material,
   wherein the plug-in connector part comprises a charging plug for charging an electric vehicle,
   wherein the plug-in connector part has a housing body to which the housing part is attached,
   wherein the housing part has an edge that is sealed in relation to the housing body for a moisture-tight transition between the housing part and the housing body, and
   wherein sealing of the housing body takes place solely by the housing part.

2. The plug-in connector part according to claim 1, wherein the housing part is comprised of plastics material.

3. The plug-in connector part according to claim 1, wherein the attachment part is comprised of metal.

4. The plug-in connector part according to claim 3, wherein the attachment part is comprised of die-cast metal.

5. The plug-in connector part according to claim 1, wherein the attachment part has a planar portion that rests against an associated planar portion of the housing part and from which the at least one plug-in portion projects.

6. The plug-in connector part according to claim 1, wherein the attachment part has at least one form-fit element that form-fittingly engages with an associated mating form-fit element of the housing part such that the attachment part is secured so as not to rotate relative to the housing part about an insertion direction in which the plug-in connector part is connectable to the mating plug-in connector part.

7. The plug-in connector part according to claim 6, wherein the at least one form-fit element of the attachment part comprises a pin that engages with an associated mating form-fit element of the housing part comprising an opening.

8. The plug-in connector part according to claim 1, wherein the attachment part has an engagement element that engages with a mating element of the housing part.

9. The plug-in connector part according to claim 8, wherein the engagement element has an opening through which a fastening element engages so as to fasten the attachment part to the housing part.

10. The plug-in connector part according to claim 2, wherein the plastics material comprises a thermoplastic material.

11. The plug-in connector part according to claim 4, wherein the die-cast metal comprises die-cast aluminum.

* * * * *